(12) United States Patent
Cooper et al.

(10) Patent No.: US 7,347,882 B2
(45) Date of Patent: Mar. 25, 2008

(54) METHOD OF MANUFACTURING OF ABRASIVE TOOLS

(76) Inventors: Alex Cooper, 30-96 Brighton 6 #D3, Brooklyn, NY (US) 11235; Yevgeny Bederak, 47 Tougview Dr., Long Meadow, MA (US) 01106; Alexander Bederak, 47 Tougview Dr., Long Meadow, MA (US) 01106

( * ) Notice: Subject to any disclaimer, the term of this patent is extended or adjusted under 35 U.S.C. 154(b) by 67 days.

(21) Appl. No.: 11/332,648

(22) Filed: Jan. 17, 2006

(65) Prior Publication Data

US 2007/0164490 A1   Jul. 19, 2007

(51) Int. Cl.
*B24D 3/00* (2006.01)
*B24D 11/00* (2006.01)
*B24D 17/00* (2006.01)
*B24D 18/00* (2006.01)
*C09K 3/14* (2006.01)

(52) U.S. Cl. .................... 51/293; 164/98; 428/593.5
(58) Field of Classification Search ............... 51/293; 164/98; 428/593.5
See application file for complete search history.

(56) References Cited

U.S. PATENT DOCUMENTS 2,391,589 A  * 12/1945  Nussbaum ............... 51/307
3,178,273 A  *  4/1965  Libal ...................... 51/293
3,239,321 A  *  3/1966  Blainey et al. ............ 51/309
3,389,981 A  *  6/1968  Strauss, Jr. ............... 51/293
4,693,385 A  *  9/1987  Lamping et al. .......... 215/232
5,224,533 A  *  7/1993  Kantner et al. ........... 164/98
2001/0033804 A1* 10/2001  An .......................... 419/8

* cited by examiner

*Primary Examiner*—J. A. Lorengo
*Assistant Examiner*—Pegah Parvini
(74) *Attorney, Agent, or Firm*—I. Zborovsky

(57) ABSTRACT

A method of producing an abrasive tool, comprising the steps of preparing a blank of an abrasive tool including abrasing grains in a bond; placing the thusly formed blank in a container; covering the thusly formed blank in the container with at least a protective material; applying a glass material in the container so as to close the container and to form a lock which prevents penetration of an outside atmosphere through the lock into an interior of the container and at the same time allows escape of gases and contaminant from the interior of the container outside; placing the container into a heating device and providing in the heating device a temperature allowing melting of the glass material and creating the lock and also providing sintering of the blanks in the interior of the container; removing the container from the heating device after the sintering; breaking the lock and removing the sintered blanks which form the abrasive tools from the container.

1 Claim, 2 Drawing Sheets

METHOD OF MANUFACTURING OF ABRASIVE TOOLS

BACKGROUND OF THE INVENTION

The present invention relates to a method of manufacturing of abrasive tools.

More particularly, it relates to a method of manufacturing of metal bond abrasive tools.

Methods of manufacturing of metal bond abrasive tools are generally known. In accordance with one method, a blank of a tool is prepared in a mold and then sintered in the same mold, as disclosed for example in U.S. Pat. Nos. 3,178,273, 3,239,321, 3,650,715, 3,378,365, 3,574,580, 3,293,012. In accordance with another method, the shaped blank made in mold is sintered in a vacuum chamber as disclosed for example in U.S. Pat. Nos. 3,389,981, 3,464,804. It is also known to make a tool blank in a mold and sinter in a graphite heater.

Known technologies use expensive molds having a short service life. Also, using a vacuum furnace is expensive as well. Braising technique needs a flux which must bond both abrasive grains and the bond metal, which flux detracts from bond. Sintering in the metal molds in hydrogen environment is very expensive because of the expensive equipment needed and also there is a danger of explosion.

SUMMARY OF THE INVENTION

Accordingly, it is an object of the present invention to provide a method of manufacturing of abrasive tools, in particular super abrasive tools, which is a further improvement of the existing methods.

In keeping with these objects and with others which will become apparent hereinafter, one feature of the present invention resides, briefly stated, in a method of manufacturing an abrasive tool, comprising the steps of forming a tool blank; introducing it in a container filled with a material for sintering the tool blank; and closing the container by a cover composed of a glass material which melts at a predetermined temperature to provide a lock for protecting an interior of the container from atmosphere and at the same time allowing escape of gases from the interior of the container and creation of a desired atmosphere in the interior of the container.

When a method is performed in accordance with the present invention, it constitutes a significant improvement of the existing methods of making the abrasive tools, the invented method is less expensive, it requires a simpler and less expensive equipment, it provides the desired quality of the abrasive tools.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
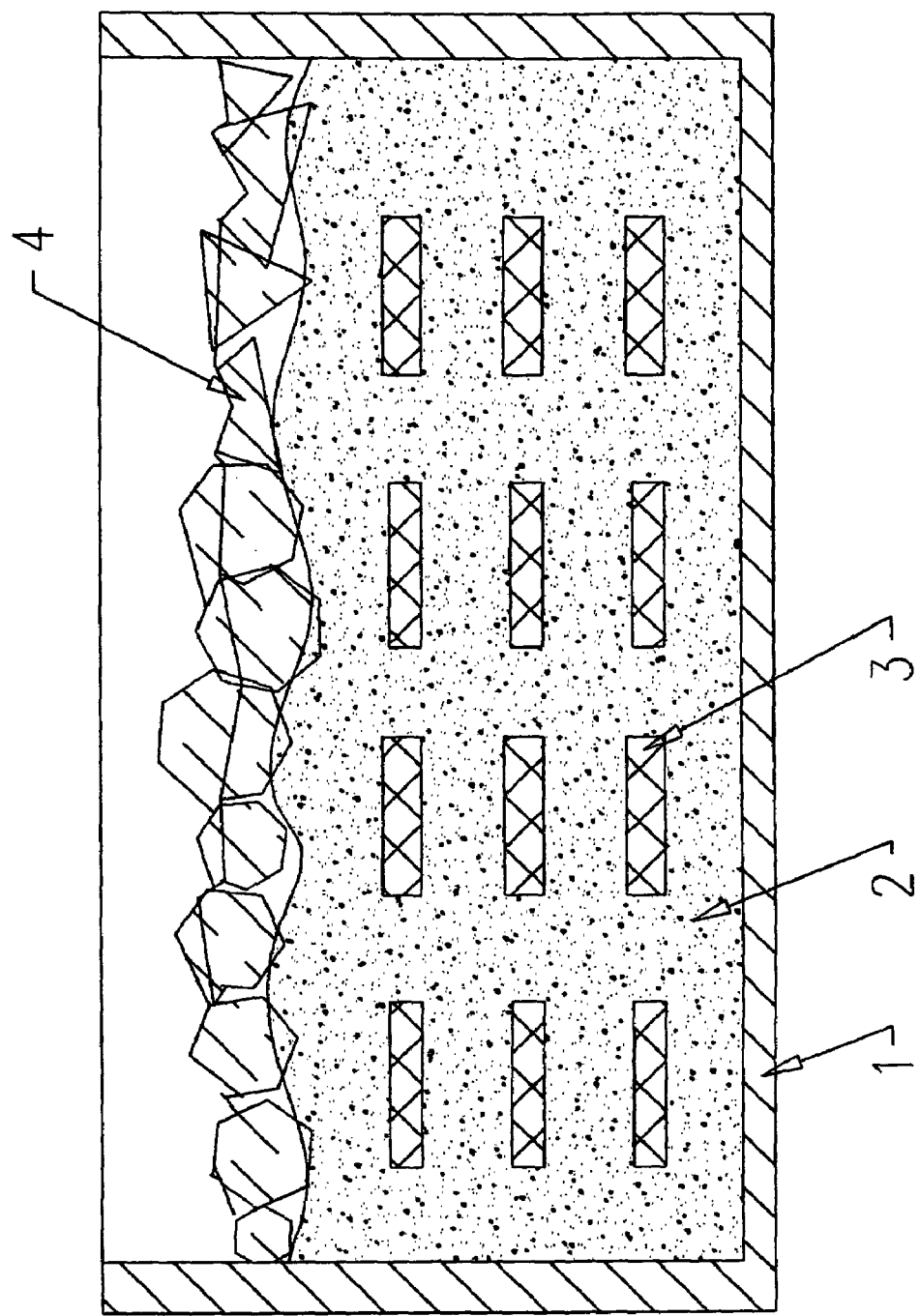
FIG. 1 is a view schematically illustrating a method of producing abrasive tools in accordance with the present invention.

For manufacturing an abrasive tool, a container 1 is provided as shown in FIG. 1. The container 1 can be formed for example as a metal box and the like. Blanks of abrasive tools are first formed for example by pressing of corresponding components of the abrasive tool, such as a mixture of abrasive grains (diamonds, tungsten carbide, etc.) in a material of metal bond (copper-based, tin-based, nickel-based, chromium based, etc.). The blanks 3 are introduced into the interior of the container 1, one layer after another, and covered with an additional material, which can include an inert powder (for example $Al_2O_3$), and protectors (for example $Ti_1$, $TiH_2$). The blanks 3 of the abrasive tools are completely surrounded by the material 2 in the container 1.

In accordance with the present invention, glass composition 4 is placed on top of the material 2 in the container 1. At a predetermined temperature for example at the temperature of 600-700° C., the glass composition starts to melt, it adheres to the walls of the container and creates a lock on the surface of the material 2. This lock separates and protects the content in the container from outside atmosphere. It also works as a capillary pump to move out gases from the interior of the box and to create a required atmosphere in the interior of the box. When the temperature reaches the lowest sintering point, the glass cover creates a full air tight seal from the outside atmosphere of a furnace into which the container 1 is introduced for sintering. After a certain welling time in the furnace, during which the abrasive tool blanks are sintered at temperature of 800-850° C., the container is removed from the furnace and cooled to room temperature. Then the glass cover 4 is broken, and the sintered abrasive tool is already removed from the box.

For forming the bond of the abrasive tools, it is possible to use for example a so-called "soft bond" which operates for machining of marble and multi-disk cutting of granite. It can be used as a sublayer also for connecting the working layer including abrasive grains and the steel body. Such a bond includes powders of copper, tin, carbonylic nickel, chromium, fluoric sodium (NaF) in the quantities of 70.2:17.4:10:2:0.4 mass percent. The powders are mixed in a mixer for 16 hours or in a spinning mixer in 4-5 minutes. The copper powder can be freshly reduced, while the power of NaF can be preliminarily burned at temperatures of 100-150° C. during one hour for removing of moisture. It is very important to use carbonylic nickel, since electrolytic nickel contains molecular hydrogen which is difficult to remove during sintering and gives the high porosity. The size of particles of the components must not exceed 100 microns.

The diamond-containing mixture is pressed in press-molds. For obtaining tools with hardness HRB90-100, the pressure force must be 5-6 t/cm². The pressed blanks are sintered in the container as explained herein above.

The container can have a rectangular shape or a round shape. At first chips of paraffin in the quantity of about 0.1 percent of mass of the articles to be sintered is placed on the bottom of the clean container. Then a layer of powder coating with a thickness of 10 mm is placed. Then the pressed blanks are placed on this layer so that there is a gap between them and they do not touch each other. Then, the blanks are covered with a power layer of 10 mm thickness and again a powder coating is introduced. This is repeated several times, depending on the height of the container and number of the articles to be centered. The last layer of the blanks is placed at the height of 70-80 mm from the upper edge of the container and it is covered by a powder layer of 50 mm. A cover is placed on the lastly formed structure, which is composed of high temperature sheet material, for example asbestos, and the container is closed. A layer of burnt sand with thickness 20 mm is placed above the cover. Then on top of the sand a piece of glass with a size 10-15 mm is placed. A powder of borax is poured between the glass pieces, with a ratio of 70:30 of glass to borax.

The filling material is prepared as follows. A large-crystal powder of electric corundum is preliminarily burned at 900° C. during one hour and then mixed with powder of Ti and $TiH_2$ with a ratio of 16:3:1. The powders of titanium and hydrate titanium do not have limitations as to the particle size and chemical composition. Therefore, inexpensive industrial powders can be utilized.

A standard heating furnace is used, which is heated to the temperature of 800° C., and the container with the blanks is introduced into it. Then the temperature is raised to 850° C. with the speed 1.5-2° per minute. When this temperature is reached, the container is held isothermally from 0.5 to 1.5 hours depending on the size of the container. For the container with diameter of 100 mm it takes 1 hour, for the container with a diameter of 180 mm, it takes about 1.5 hours. After the isothermic phase, the container is removed from the surface and cooled to room temperature. The glass lock is then broken, and the asbestos cover is released from glass and sand. The cover is removed and the sintered articles are unloaded.

The glass which is used here can be the glass which is usually used for TV glass panels.

The composition of the glass which forms a lock can be as follows:

| Weight, % | Glass Component |
|---|---|
| ~60 | $SiO_2$ |
| ~5.0-10.0 | $K_2O$; $Na_2O$; SrO |
| ~0.5-5.0 | $Al_2O_3$; MgO; CaO; ZrO |
| ~<0.5 | $SB_2O_3$; $FE_2O_3$; $CEO_2$; $TiO_2$; NiO; $Co_3O_4$ |

Figure 2:
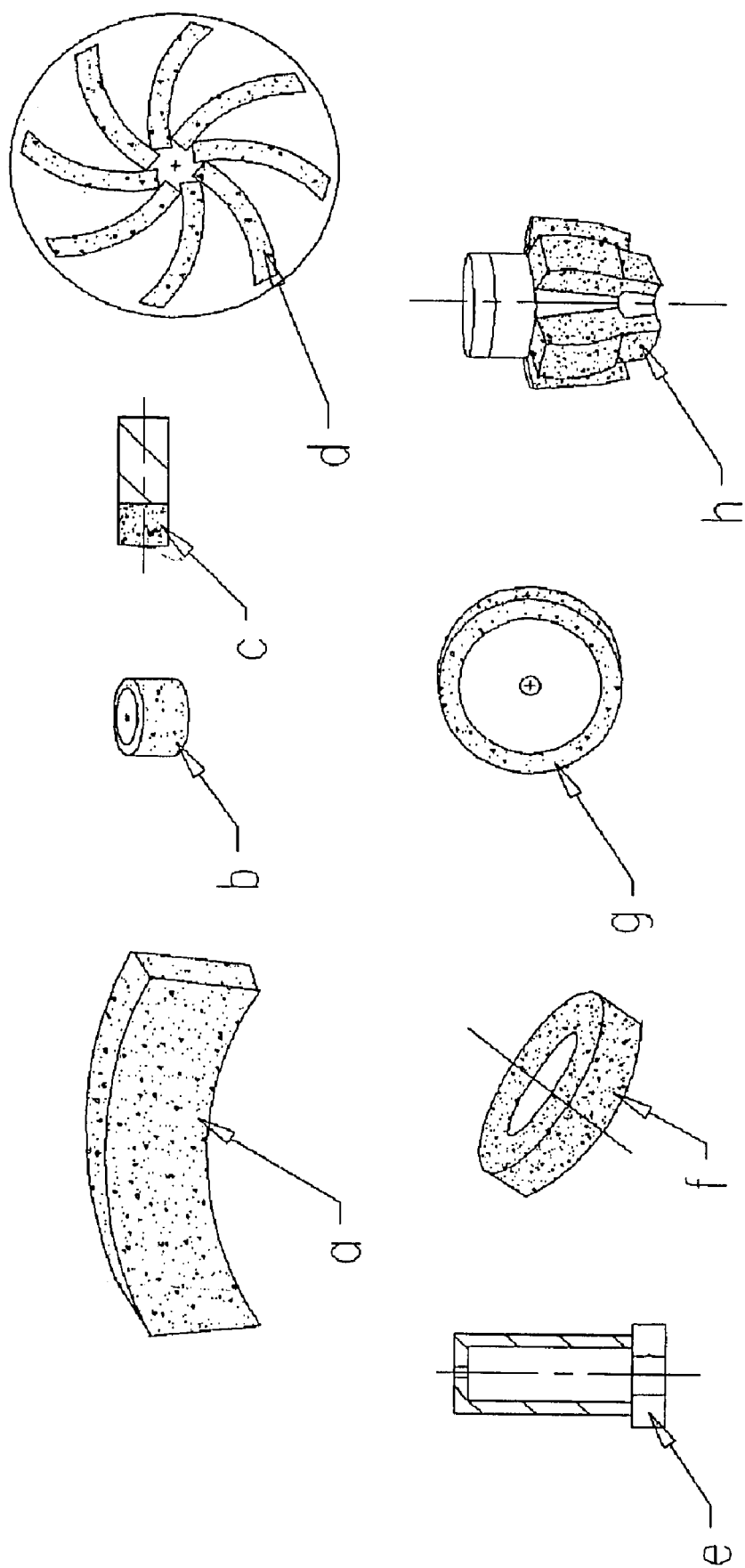
FIG. 2 is a view schematically showing various abrasive tools which can be produced, as an example, with the invented method.

FIG. 2 shows various abrasive tools which can be made in accordance with the inventive method. In accordance with the present invention, it is possible to make curved abrasive segments shown in FIG. 2a, a roller of abrasive material shown in FIG. 2b, a segment disc having a metal holder and an abrasive segment shown in FIG. 2c, an abrasive disc including a disc-shaped body with a plurality of spiral-shaped segments shown in FIG. 2d, an abrasive core drill having a cylindrical holder with round abrasive layer as shown in FIG. 2e, a hollow abrasive wheel shown in FIG. 2f, an abrasive disc including a disc-shaped body with a disc-shaped working layer showing in FIG. 2g, a drill bit having a body with a plurality of segments shown in FIG. 2h, etc.

It will be understood that each of the methods described above, or two or more together, may also find a useful application in other types of methods differing from the types described above.

While the invention has been illustrated and described as embodied in a method of manufacturing abrasive tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claims as new and desired to be protected by Letters Patent is set forth in the appended claims:

1. A method of producing an abrasive tool, comprising the steps of preparing a blank of an abrasive tool including abrasing grains in a bond; placing the thusly formed blank in a container; covering the thusly formed blank in the container with at least a protective material; applying a glass material in the container so as to close the container and to form a lock which prevents penetration of an outside atmosphere through the lock into an interior of the container and at the same time allows escape of gases and contaminant from the interior of the container outside; placing the container into a heating device and providing in the heating device a temperature allowing melting of the glass material and creating the lock and also providing sintering of the blanks in the interior of the container; removing the container from the heating device after the sintering; breaking the lock and removing the sintered blanks which form the abrasive tools from the container.

* * * * *